United States Patent [19]
Yoshino et al.

[11] Patent Number: 5,694,637
[45] Date of Patent: Dec. 2, 1997

[54] METHOD FOR CONTROLLING AN IMAGE FORMING APPARATUS WHICH USES PLURAL LASER BEAMS

[75] Inventors: Kunihisa Yoshino; Hiroyuki Yamamoto; Jun Yokobori; Shizuo Kayano, all of Hachioji, Japan

[73] Assignee: Konica Corporation, Tokyo, Japan

[21] Appl. No.: 706,750

[22] Filed: Sep. 9, 1996

[30] Foreign Application Priority Data

Sep. 14, 1995 [JP] Japan ................... 7-236930

[51] Int. Cl.$^6$ ................... G03G 15/00; G02B 26/10
[52] U.S. Cl. ................... 399/38; 347/235
[58] Field of Search ................... 399/32, 38, 46, 399/49, 70, 127; 347/234, 235, 248, 250

[56] References Cited

U.S. PATENT DOCUMENTS

| | | | |
|---|---|---|---|
| 4,618,247 | 10/1986 | Tsuji | 399/70 |
| 4,791,453 | 12/1988 | Koseki et al. | 399/82 |
| 5,583,557 | 12/1996 | Yamamoto et al. | 347/235 |

FOREIGN PATENT DOCUMENTS

| | | |
|---|---|---|
| 62-66947 | 3/1897 | Japan . |
| 57-39669 | 3/1982 | Japan . |
| 63-50809 | 3/1988 | Japan . |
| 2-188713 | 7/1990 | Japan . |
| 7-248458 | 9/1995 | Japan . |
| 8-68956 | 3/1996 | Japan . |
| 8-95460 | 4/1996 | Japan . |

*Primary Examiner*—Joan H. Pendegrass
*Attorney, Agent, or Firm*—Frishauf, Holtz, Goodman, Langer & Chick

[57] ABSTRACT

A method for controlling an image forming apparatus which has a photoreceptor and a writing system to write a latent image on the photoreceptor with plural laser beams. The method includes the steps of: correcting positional deviations among the plural laser beams; conducting at least one of maximum density correction and gradation correction for image forming operation of the image forming apparatus by providing at least one standard density pattern on the photoreceptor with the plural laser beams; and repeating the correcting step of positional deviations among the plurality of laser beam. All of the steps are conducted when the image forming apparatus is in a warm-up state in succession to a turn-on operation thereof.

4 Claims, 9 Drawing Sheets

METHOD FOR CONTROLLING AN IMAGE FORMING APPARATUS WHICH USES PLURAL LASER BEAMS

BACKGROUND OF THE INVENTION

The present invention relates to an image forming apparatus and a method for controlling the same, both used for an electrophotographic copying machine wherein images are written by plural laser beams and for a laser bee printer.

For an image forming apparatus wherein recording of image information is carried out through scanning on a recording medium with a laser beam (light beam) modulated based on image signals and deflected by a polygon mirror or the like, it has been known that image recording at high speed can be attained by constitution in which plural lines are recorded simultaneously by the use of plural laser beams (Japanese Patent Publication Open to Public Inspection No. 188713/1990 (hereinafter referred to as Japanese Patent O.P.I. Publication)).

When making plural laser beams to scan simultaneously as stated above, if a scanning position deviates in the primary scanning direction or in the sub-scanning direction among plural laser beams, unevenness of line distances and deviation of start writing positions worsen fidelity of image forming, resulting in deterioration of image quality.

Reflecting the viewpoint mentioned above, Japanese Patent O.P.I. Publication Nos. 188713/1990 and 39669/1982 disclose constitution wherein an amount of positional deviation in the primary scanning direction among plural laser beams is detected and the position to start writing for each laser beam is determined based on the amount of positional deviation in an image forming apparatus disclosed therein. Further, correction of an amount of positional deviation in each of the primary scanning direction and the sub-scanning direction is proposed by the inventors of the present invention in Japanese Patent O.P.I. Publication Nos. 248458/1995 and 68956/1996.

In the case of an image forming apparatus wherein images are written by a plurality of laser beams, the apparatus is shipped after the correction of positional deviation from the right position of each laser beam conducted immediately before the factory shipments. However, with regard to the image forming apparatus which has been shipped, it is difficult that conditions of a laser beam for writing corrected on the occasion of shipment can be kept for a long time because of changes in environmental conditions, and there has been observed a tendency that a positional deviation is caused to deteriorate image quality to be printed out.

Recently, in particular, there has been a demand for improvement of image quality for keeping step with a smaller particle size and higher resolution of toner.

Heretofore, in an image forming apparatus employing electrostatic transfer process, there has been needed a warm-up state period spanning from turning on of the power source for the start of copying to the moment when a fixing unit arrives at a fixing temperature, and nothing has been done during this warm-up state.

However, an image forming apparatus has a nature that an amount of charge of toner in a developing agent is lowered when the power source is kept to be off for a long time, and there has been a problem of copy image that image density goes up or fog is caused when the apparatus is left suspended for a long time. There have further been problems that density of an image by means of laser recording does not become sufficient or gradation can not be kept favorably.

Japanese Patent O.P.I. Publication No. 95460/1996 applied by the inventors of the present invention is to normalize the charged state of a developing agent and thereby to correct the maximum density and to correct the gradation during the warm-up state.

The inventors of the present invention studied how to correct positional deviations of plural laser beams during the warm-up state. When the positional deviations are corrected insufficiently, a solid black image (the highest density portion) appears to be uneven density of a pattern of fine lateral streaks, and when conducting the above-mentioned maximum density correction, for example, measured density value varies depending on the measurement point on a test pattern, making the appropriate maximum density correction impossible, if the positional deviation is not corrected prior to the maximum density correction. As a result of experiments and studies, the present inventors conducted maximum density correction and gradation correction as a correction for image forming after correcting the positional deviations of plural laser beams during the warm-up state. Thus, optimum maximum density correction and gradation correction were conducted, and print images excellent in reproducibility were obtained for originals having halftones like photographs, in the printing thereafter. However, when the print images were checked in detail, it was proved that positional deviations were not corrected satisfactorily despite the correction of positional deviations of plural laser beams conducted during the warm-up state. As a result of various studies for causes of the result which seems to be contradiction apparently, the present inventors successfully cleared the causes An object of the invention is to provide both an image forming apparatus that has a writing system to write images with a plurality of laser beams and is capable of providing images with high image quality through corrective processing by means of an appropriate program conducted during its warm-up state and a method of controlling the image forming apparatus.

Further, the studies made by the present inventors cleared that when an image forming apparatus is left to be turned off for a long time, it is necessary to conduct, before printing, the correction for image forming by means of an appropriate program including correction of positional deviations of plural laser beams, but when the image forming apparatus is left to be turned off for a short time, it is not necessary to conduct the above-mentioned correction by means of an appropriate program including the correction of positional deviations of laser beams.

In addition to the aforementioned object, further object of the invention is to provide both an image forming apparatus capable of providing images with high image quality without being corrected excessively and a method of controlling the image forming apparatus.

SUMMARY OF THE INVENTION

The invention attaining the aforesaid objectives provides, a method for controlling the image forming apparatus wherein a writing system to write images with plural laser beams wherein during the warm-up state in succession to the turn-on operation of the image forming apparatus, there are conducted the first processing step to correct positional deviations among the plural laser bees, the second processing step to provide at least one standard density pattern on a photoreceptor with the plural laser beams and thereby to conduct correction for image forming, and the third processing step to conduct again the correction of positional deviations among aforesaid plural laser beams, and a method for controlling the image forming apparatus wherein a writing system to write images with plural laser beams wherein when a temperature of a fixing unit is detected after the image forming apparatus is turned on and the temperature is not higher than a predetermined temperature, there are conducted the first processing step to correct positional deviations among said plural laser beams, the second processing step to prepare at least one standard density pattern on a photoreceptor with aforesaid plural laser beams and thereby to conduct correction for image forming, and the third processing step to conduct again the correction of positional deviations among said plural laser beams.

Time required for warm-up operation is generally a period of time needed for a fixing unit of an image forming apparatus to rise to a temperature capable of fixing, and during the warm-up state, environmental conditions in the image forming apparatus, especially temperature and humidity, vary considerably. Therefore, even when the first correction of positional deviations of laser beams is conducted, environmental conditions are changed while there is conducted the correction for image forming by means of laser beams such as, for example, the correction of maximum density or the correction of gradation, and thereby a laser optical system for conducting imagewise exposure such as, for example, a semiconductor laser or a mirror is subjected to a delicate deformation or displacement when the warm-up operation is completed, thus, positional deviations are caused in printing despite the first correction of positional deviations of the laser beams. In the invention, the second correction of positional deviations of plural laser beams is conducted immediately before or right after the warm-up of a fixing unit, which follows the processing step of correction for image forming by the use of plural laser beams.

A program of these correction processes is not executed fixedly, but the temperature of a fixing unit after an image forming apparatus is turned on is detected, and thereby there is assumed whether the apparatus has been left to be suspended for a long time or not, and the program of aforesaid correction process is executed only when the apparatus is assumed to be suspended for a long time.

DETAILED DESCRIPTION OF THE PREFERRED EMBODIMENT

Prior to explanation of the invention, an image forming apparatus to which the invention is applied will be explained in terms of its constitution and operations, referring to the drawings.

Figure 1:
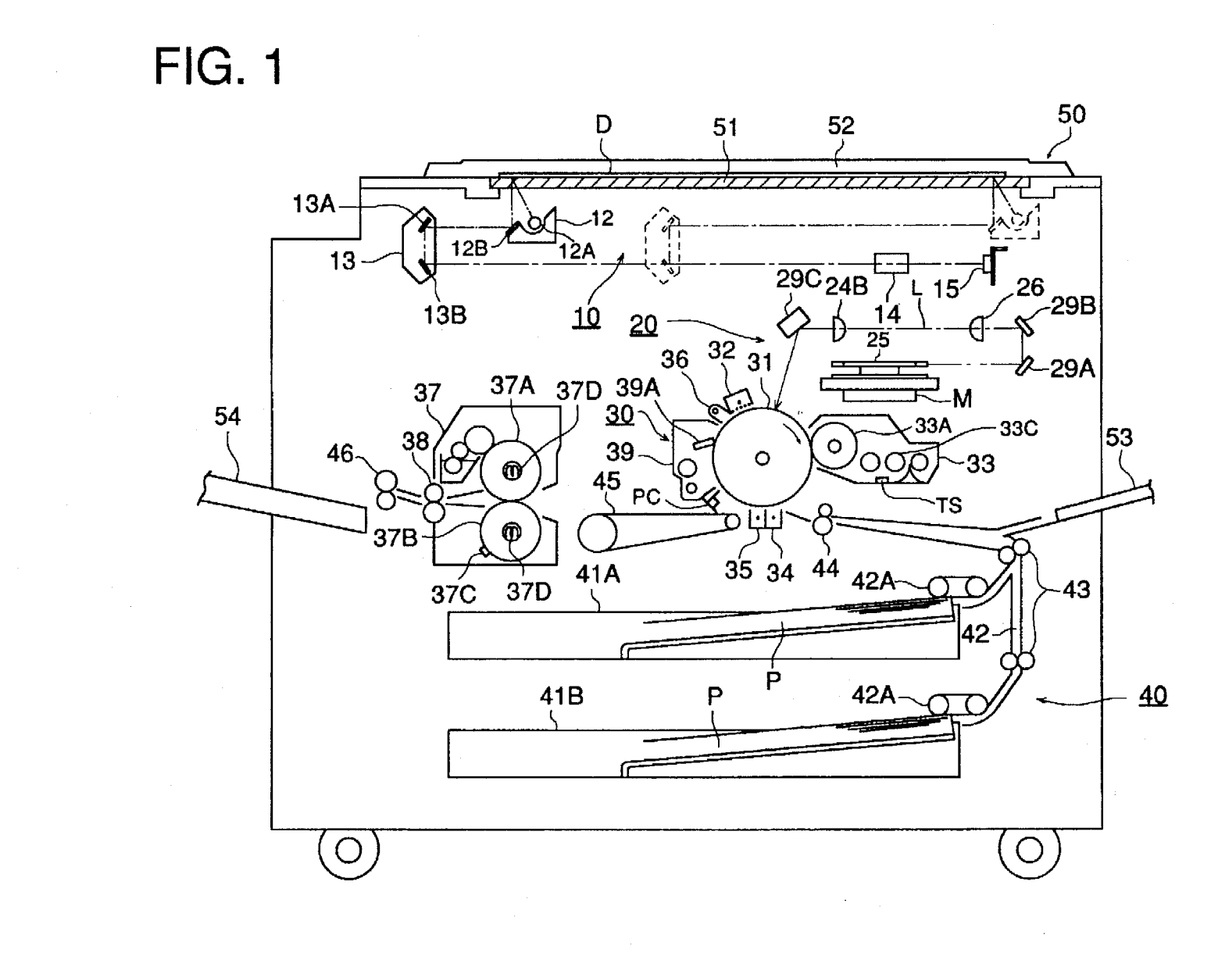
FIG. 1 is a schematic structural diagram of an example of an image forming apparatus of the invention.

FIG. 1 is a schematic structural diagram showing an example of an image forming apparatus of the invention.

First, there will be explained ordinary copying operations of the image forming apparatus. The image forming apparatus is composed of image reading unit 10, writing section 20 representing a digital writing system, image forming section 30, sheet-feeding section 40 and original-placing section 50.

On the upper part of the image forming apparatus, there is provided original-placing section 50 composed of original stand 51 made of a transparent glass plate or the like and further of original cover 52 which covers original D placed on the original stand 51. Under the original stand 51 and inside the apparatus main body, there is provided image reading unit 10 which is composed of first mirror unit 12, second mirror unit 13, photographing lens 14 and image pickup element 15 such as a CCD array.

An image of original D placed on the original stand 51 is subjected totally to illumination-scanning by parallel movement from the position shown with solid lines to that shown with broken lines of the first mirror unit 12 of the image reading unit 10 equipped with illumination lamp 12A and first mirror 12B and by driven movement of the second mirror unit 13 equipped solidly with second mirror 13A and third mirror 13B both facing each other, the speed of the driven movement being one-half that of the first mirror unit 12, and that image is formed on the image pickup element 15 by the photographing lens 14 through the first mirror 12B, the second mirror 13A and the third mirror 13B. After the scanning is finished, the first mirror unit 12 and the second mirror unit 13 return to their initial positions to stand ready for the following image forming.

Image data obtained through photoelectric transfer conducted by aforesaid image pickup element 15 are subjected to MTF correction or γ correction by image signal processing section 60, after being converted to digital signals, and are stored temporarily in a memory as image signals. Then, aforesaid image signals are read out of the memory by the control of CPU 90, modulated in terms of pulse width, and then are inputted in the writing section 20.

The image forming section 30 starts operating for image recording when aforesaid image signals are inputted in writing section 20 explained later by the control of CPU 90. Namely, photoreceptor drum 31 representing an image carrier rotates clockwise as shown by an arrow to be neutralized by neutralizing unit 36 which neutralizes by conducting pre-charging, and then is given charges by charging unit 32. Therefore, an electrostatic latent image corresponding to an image of original D is formed on photoreceptor drum 31 by laser beam L of the writing section 20. After that, the electrostatic latent image on the photoreceptor drum 31 is subjected to reversal developing carried out by developing agent held on developing sleeve 33A which is a developer carrier impressed with bias voltage of developing unit 33, to become a visible toner image.

On the other hand, from sheet-feeding cassette 41A or 41B loaded in the sheet-feeding section 40, transfer sheet P in prescribed size is fed out by feed-out roller 42A one sheet by one sheet, and then is transported toward an image transfer section through feed-out roller 43 and guide member 42. The transfer sheet P thus transported is fed out on the photoreceptor drum 31 by registration roller 44 that operates in synchronization with the toner image on the photoreceptor drum 31. Onto this transfer sheet P, the toner image on the photoreceptor drum 31 is transferred by transfer unit 34, and then is separated from the photoreceptor drum 31 by neutralizing action of separating unit 35. After that, the transfer sheet P is sent to fixing unit 37 through conveyance belt 45 so that the toner image thereon is fused and fixed by heating roller 37A and pressure roller 37B, thus the transfer sheet P is ejected by sheet-ejecting rollers 38 and 46 to tray 54 located outside the apparatus. The numeral 53 represents a sheet-feeding stand for by-pass feeding.

Aforesaid photoreceptor drum 31 further keeps rotating, and toner remaining on its surface without being transferred is removed and cleaned by cleaning blade 39A that is in pressure contact with the photoreceptor drum 31 in cleaning unit 39, then, the photoreceptor drum 31 is charged uniformly by charging unit 32 after being neutralized again by neutralizing unit 38 to be ready for the succeeding image forming process.

Figure 2:
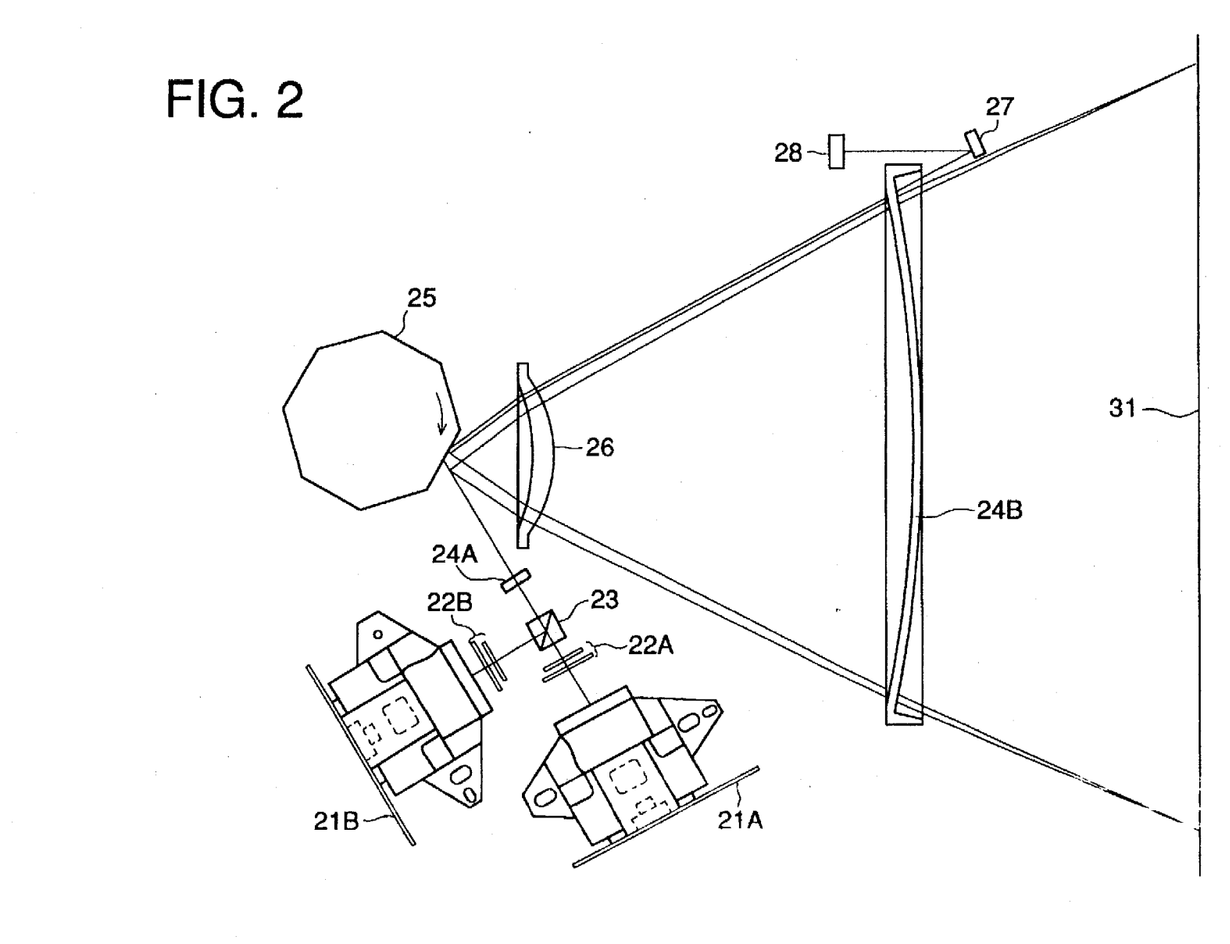
FIG. 2 is a plan view showing a laser writing portion in the apparatus shown in FIG. 1.

FIG. 2 is a plan view showing laser writing section 20 of the apparatus shown in FIG. 1, and reflection mirrors 29A, 29B and 29C in FIG. 1 are omitted.

In FIG. 2, 21A and 21B represent a laser unit which consists solidly of a semiconductor laser that is turned on or off corresponding to image signals, a collimator lens that converts a laser beam emitted from the semiconductor laser into parallel light, and an automatic power control unit (APC) that monitors output of the semiconductor laser and keeps its output constant by controlling an amount of current to be impressed so that the constant output value may be maintained, while 22A and 22B represent an adjustment prism which adjusts the direction for emitting a laser beam, 23 represents a translucent prism which is a compound prism emitting two laser beams crossing at right angles in their same directions, 24A and 24B represent a cylindrical lens provided for correcting an error of an inclination angle of each reflecting surface of polygon mirror 25, and 27 is a mirror which reflects a laser beam to beam detector 28. The beam detector 28 detects passing of a laser beam and then generates a signal to start writing an image, thus, it controls timing to start driving based on image signals for laser units 21A and 21B so that a position to start writing an image on photoreceptor drum 31 may be constant.

Two laser beams emitted from the laser units 21A and 21B respectively are reflected on polygon mirror 25, then pass through fθ lens 26, cylindrical lenses 24A and 24B and reflection mirrors 29A–29C and scan on photoreceptor drum 31 for exposure. In this case, aforesaid laser beams are focused to be spots aligned closely each other in the sub-scanning direction, thus, there is conducted two-beam writing wherein two scanning lines are drawn simultaneously on the photoreceptor drum 31. Owing to this, image signals corresponding to alternate scanning lines are inputted simultaneously in laser units 21A and 21B so that two scanning lines are drawn at a time, and it is possible to record images at the printing speed which is twice that of an apparatus employing one set of laser unit. Incidentally, in the example, although the scanning lines are drawn by two laser beams in the example, three or more laser beams can also be used.

Figure 3:
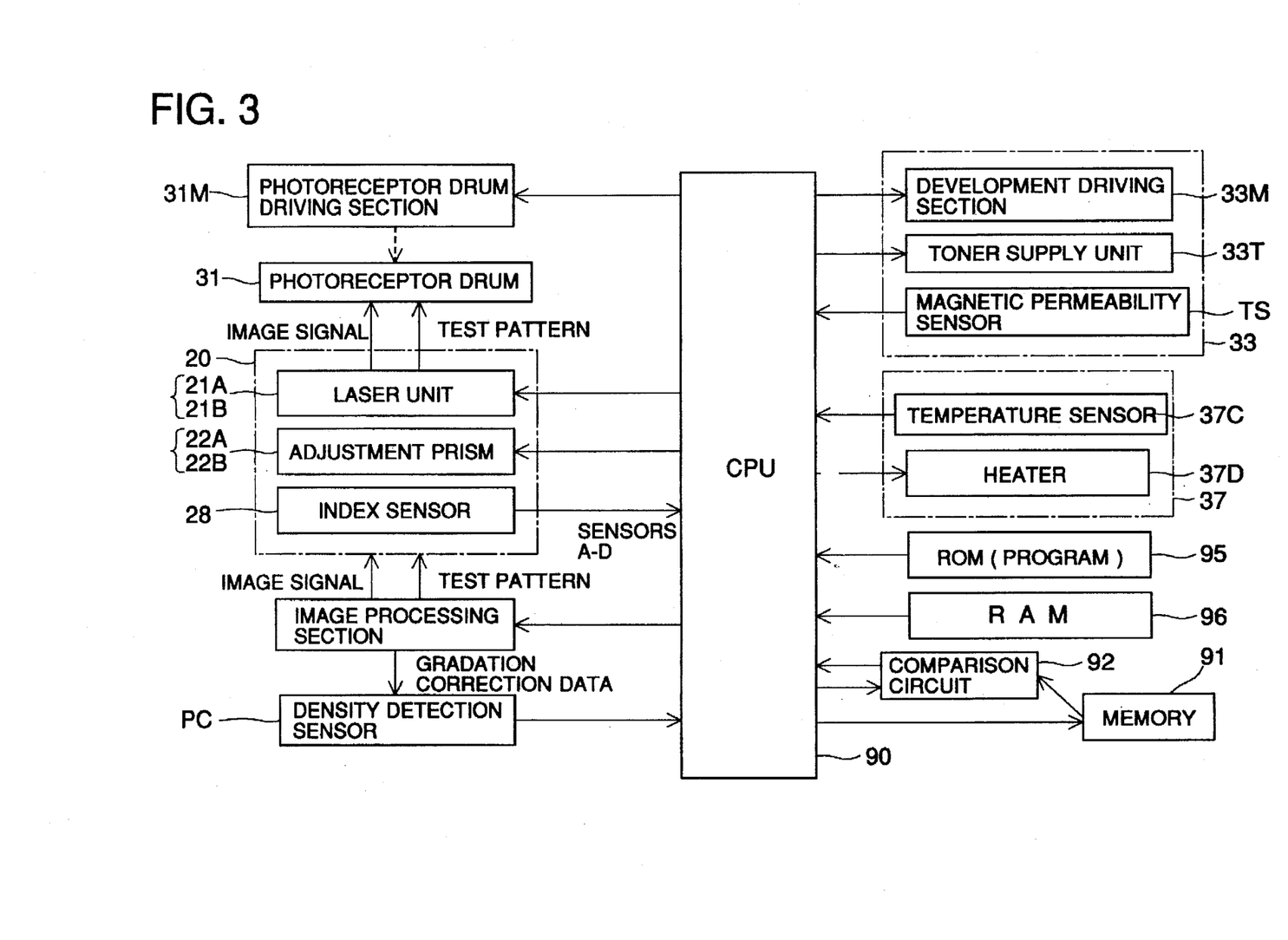
FIG. 3 is a block diagram showing an example of a control system of the invention.

When the power supply is turned on for an image forming apparatus of the invention, each correction is made in accordance, for example, with a flow of operations in starting period shown in FIG. 4, in parallel with heating of fixing unit 37, which will be explained in succession according to the flow shown in FIG. 4. Incidentally, FIG. 3 is a block diagram showing a control system of an image forming apparatus shown in FIG. 1.

(F1) When the power supply is turned on, CPU 90 measures a temperature of a fixing unit detected by temperature sensor 37C in fixing unit 37. When the temperature measured is not higher than an established temperature established in advance, a sequence advances to F2, F3 ... in the flow.

The established temperature is set to about 50° C. which is slightly higher than a room temperature. A phenomenon that a temperature of a fixing unit is lower than an established temperature means that a considerably long time has passed since the preceding printing operation and a considerably long time is required for the warm-up operation of the fixing unit to be completed. In the invention, when the fixing unit temperature is lower than the established temperature, corrections stated below are conducted in accordance with a program set in advance, by utilizing a starting period in which the warm-up operation is completed, so that copies with excellent image quality can be obtained from the beginning in printing.

On the other hand, a phenomenon that the fixing unit temperature is higher than the established temperature on the occasion of turning on the power supply indicates that a relatively short time has passed since the preceding printing operation and a relatively short time is required for the warm-up operation to be completed. In this case, therefore, there is conducted another control wherein a part or all of corrections F2–F7 are omitted to create the state of READY which means that copying operation may be started at any time upon the completion of warm-up operation of the fixing unit.

(F2) Since an amount of electrostatic charge of toner in developing agent is in the lowered state when it is left on the non-operation condition for a long time, agitation by means of agitating screw 33C in developing unit 33 is conducted in accordance with a program wherein ROM 95 stores an operation for stabilized charging to rotate agitating screw 33C for setting an amount of electrostatic charge of a developing agent to a prescribed value. As the agitating makes progress, an amount of electrostatic charge of a developing agent is increased, and it returns mostly to its original amount of electrostatic charge. The agitating time established as a program to reach the state of ready for developing is about 4 minutes. At the point of time when the developing agent has been stirred for 3 minutes, toner density control is conducted for about 1 minute.

CPU 90 controls toner density in accordance with a toner density control program stored in ROM 95. In the toner density control for a developing agent, magnetic permeability of a developing agent loaded in developing unit 33 is detected by magnetic permeability sensor TS, then, detected value is compared with a standard value and thereby a toner supply unit (not shown) is driven so that toner density of the developing agent may be controlled to be almost constant. This toner density control is conducted even in the course of copying.

Incidentally, though there is no description in the flow shown in FIG. 4, there may also be carried out initial setting of process data, laser power adjustment and preparation of the state of a photoreceptor drum all corresponding to temperature, humidity and copy quantity explained below, prior to or almost simultaneously with developer agitating and toner supply in F2.

CPU 90 is equipped with ROM 95 wherein a program to execute an electrophotographic process is written and with a function to process various output signals from an operation panel (not shown). It is further connected to sheet-ejection sensor 94 that detects ejection of a recording sheet, temperature sensor ThS for detecting a temperature inside the apparatus, and to humidity sensor HS for detecting humidity inside the apparatus. A copy quantity detected by the sheet-ejection sensor 94 is inputted in CPU 90, and is accumulated to be stored in RAM 96 as a total copy quantity. When the power supply is turned on for the start of copying, ambient temperature and humidity are read by aforesaid temperature sensor ThS and humidity sensor HS according to a program in parallel with warm-up operation of fixing unit 37, and are inputted in CPU 90. In ROM 95 connected to CPU 90, there are stored tables of process conditions which are assumed to be optimum through theoretical study in advance for the temperature, humidity and copy quantity. The process conditions in this case include transfer current in transfer unit 34 easily affected by temperature, humidity and copy quantity, in particular, the control level of magnetic permeability sensor TS which detects toner density in a developing agent, and a laser power. CPU 90 calls, for example, transfer current and magnetic permeability sensor TS out of ROM 95 as process conditions corresponding to inputted temperature, humidity and copy quantity, and sets them in RAM 96. These process conditions which are set will serve as established conditions for printing.

Laser power adjustment is conducted in accordance with a laser power adjustment program stored in ROM 95. The laser power adjustment mentioned in this case means APC (Automatic Power Control) which makes a semiconductor laser of writing unit 20 to emit light for a moment and makes adjustment by receiving this emitted light directly to confirm whether the prescribed amount of light is obtained or not. In this case, adjustment of laser power is made by comparing a voltage value corresponding to the prescribed amount of light with a voltage value corresponding to the light received directly, and adjusted laser power is set in RAM 96.

The preparation of the state of a photoreceptor drum is to cause charging unit 32 to charge twice or more the photoreceptor drum 31 which is an image carrier in accordance with a program from ROM 95 under the control of CPU 90 so that uniform charging at stipulated voltage (for example, −750 V) that is free from uneven charging may be obtained. Owing to this, an image area can be charged uniformly at stipulated voltage.

(F3) (F4) Since correction of positional deviation of a beam in the sub-scanning direction (F3) and that in the primary scanning direction are conducted almost simultaneously, laser writing section 20 will be explained in terms of its constitution and detection as well as correction of positional deviations of the beam.

The points to start scanning of laser beams L1 and L2 which are deflected by polygon mirror 25 in laser writing section 20 are detected by index sensor 28 arranged at the leading edge of the scanning area. A role of reflection mirror 27 is to guide the laser beams L1 and L2 to aforesaid index sensor 28 when the laser beams L1 and L2 are irradiated on the tips of scanning lines.

Figure 5:
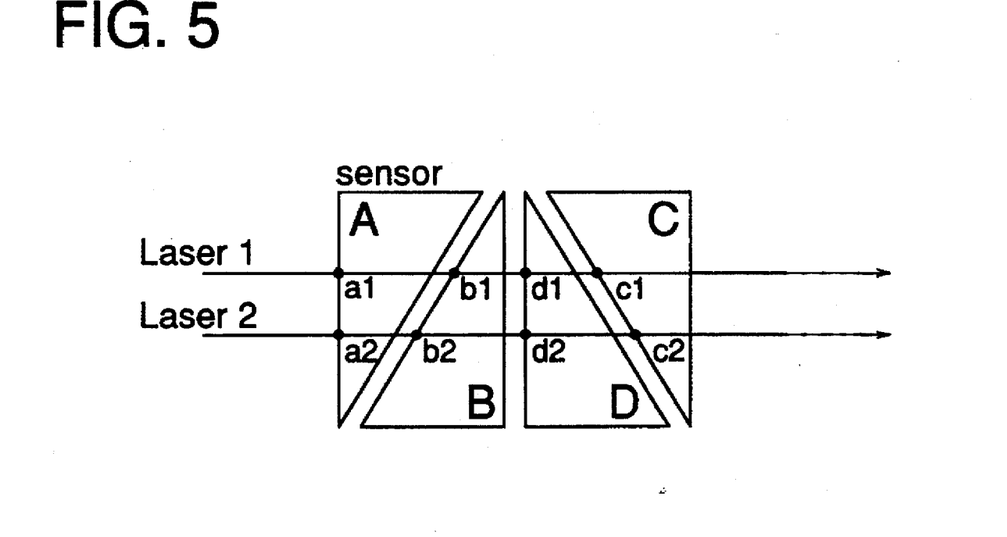
FIG. 5 is an illustration showing details of an index sensor.

In the constitution of aforesaid index sensor 28, four sensors A–D (A–D: light beam detection means) each outputting detection signals individually are arranged solidly as a one-chip sensor as shown in FIG. 5. Each of the sensors A–D is arranged in the primary scanning direction so that the laser beams L1 and L2 may scan in the sequence of A→B→D→C.

A light beam detection area (light-receiving area) for each of sensors A–D is formed to be a right-angled triangle having a height in the sub-scanning direction (vertical direction in FIG. 5) which can cover, leaving a margin, the scanning lines of two laser beams L1 and L2.

The sensor A is arranged so that a longer side among two sides forming a right angle in the detection area of the right-angled triangle represents an edge on the starting side in the primary scanning direction (left side in FIG. 5) and yet the longer side is perpendicular to the primary scanning direction (in parallel with the sub-scanning direction).

The sensor B is arranged so that the hypotenuse of the detection area of the right-angled triangle represents an edge on the starting side in the primary scanning direction and yet the hypotenuse crosses the primary scanning direction diagonally at an angle formed by the longer side and the hypotenuse.

The sensor D is arranged as if the detection area of the sensor A is turned upside down under the condition that the sub-scanning direction is vertical.

Further, the sensor C is arranged so that the sensor A and its detection area are axisymmetric about the axis that is in parallel with the sub-scanning direction.

Although the sensors A and C shown in FIG. 5 are arranged so that the longer side among two sides forming the right angle is perpendicular to the primary scanning direction, they can also be arranged so that the longer side is in parallel with the primary scanning direction.

With regard to the edge on the starting side in the primary scanning direction in each of the sensors A–D, those in the sensors A and D are in parallel with each other along the sub-scanning direction, while, those in the sensors B and C are not in parallel with each other and yet they are opposite in terms of the direction of inclination from the primary scanning direction. Namely, in the sensors B and C, the distance between the edges on the starting sides in the primary scanning direction is so great as to cause downward deviations in a scanning position of laser beams L1 and L2 in FIG. 5.

Incidentally, in FIG. 5, a position of start detecting (position where beam detection signals rise) of laser beam L1 in sensor A is shown as a1 and a position of start detecting of laser beam L2 is shown as a2, and in the same way as in the foregoing, positions of start detecting of laser beams L1 and L2 in sensors B–D are shown respectively as b1, b2, c1, c2, d1 and d2.

An interval of detection timing between laser beams in sensors A–D is the interval of the timing when a laser beam is detected at aforesaid position of start detecting, and it is, in other words, an interval of rising of beam detection signals in sensors A–D.

Now, when aforesaid sensors A–D are used, positional deviations in scanning in both the primary scanning direction and the sub-scanning direction between laser beams L1 and L2 are detected in the following method.

Figure 6:
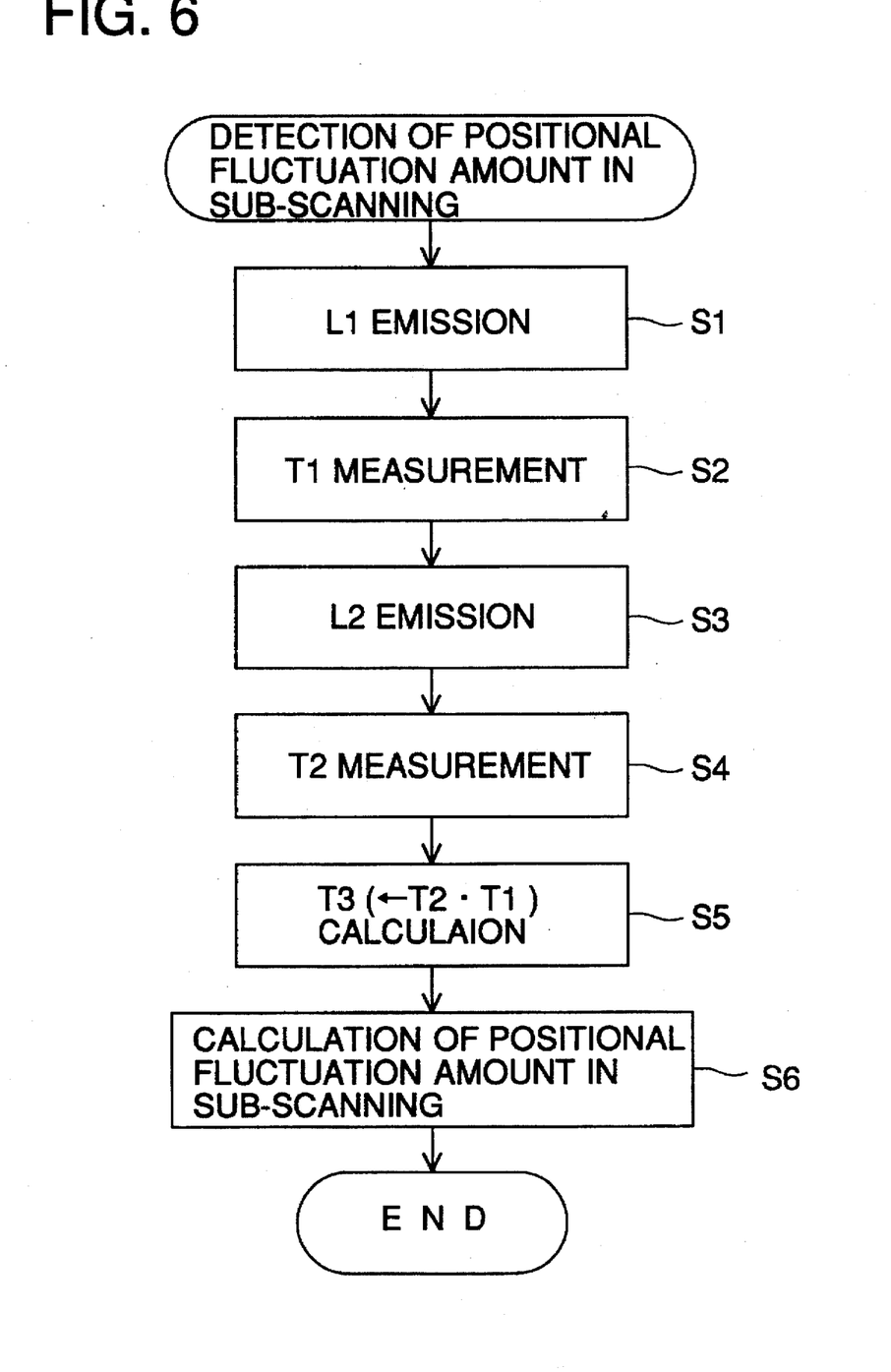
FIG. 6 is a flow chart conducting detection of an amount of positional deviations in the sub-scanning direction.

First, the detection of an amount of deviation of scanning position in the sub-scanning direction will be explained, referring to a flow chart in FIG. 6.

First, laser beam L1 only is lit for primary scanning (S1).

Then, when the laser beam L1 scans on aforesaid sensors A–D, a period of time (detection timing interval) T1 (see FIG. 7) from a rise (b1) of beam detection signal in sensor B to a rise (c1) of beam detection signal in sensor C is measured (S2).

Next, in place of laser beam L1, only laser beam L2 is lit for primary scanning (S3).

Then, in the same manner as in the foregoing, when the laser beam L2 scans on aforesaid sensors A–D, a period of time T2 (see FIG. 7) from a rise (b2) of beam detection signal in sensor B to a rise (c2) of beam detection signal in sensor C is measured (S4).

When measurement of aforesaid time T1 and T2 is completed, absolute value T3 of a deviation between the time T1 and time T2 is calculated (S5).

Further, a difference between a standard value of aforesaid deviation T3 corresponding to the condition wherein the interval between laser beam L1 and laser beam L2 in the sub-scanning direction is regular and the deviation T3 obtained actually through aforesaid processing is calculated, and the difference is converted to an amount of deviation in the sub-scanning direction (S6).

It is preferable that aforesaid standard value can be changed voluntarily to be established through an operation portion of the image forming apparatus shown in FIG. 1.

Figure 7:
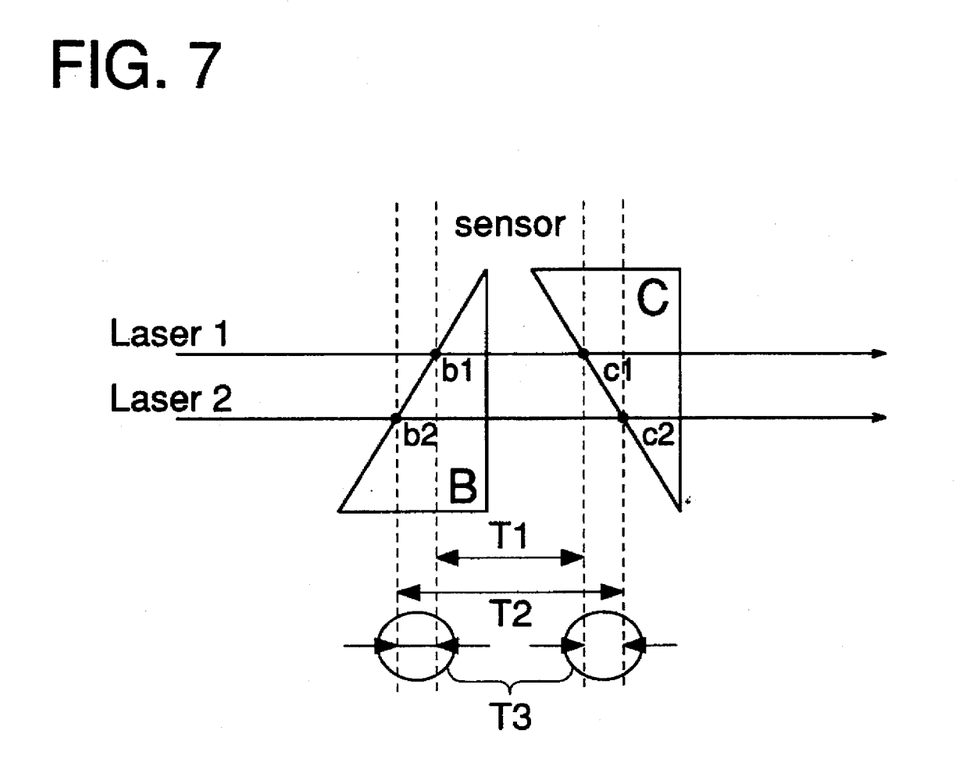
FIG. 7 is an illustration showing detection characteristics for an amount of positional deviations in the sub-scanning direction.

Namely, let is be assumed that the scanning position of laser beam L2 is deviated downward in the sub-scanning direction in FIG. 7, for example, under the assumption that positions b1 and c1 in the sub-scanning direction where laser beam L1 is detected respectively by sensor B and sensor C are the standard positions. In this case, due to an arrangement that positions b2 and c2 in the sub-scanning direction where laser beam L2 is detected respectively by sensor B and sensor C are extended at a constant rate to both sides of the primary scanning direction as a position of a distance between edges on the start detecting sides of sensors B and C goes down in FIG. 7, an interval (time T2) between positions b2 and c2 is extended by the distance corresponding to an amount of positional deviation in the sub-scanning direction, thereby, a deviation of time T3 from the standard time corresponds to an amount of positional deviation.

When a deviation between time T3 and a standard time is obtained, therefore, it is possible to calculate an amount of positional deviation of an interval in the sub-scanning direction between laser beam L1 and laser beam L2 based on information of a scanning speed and an angle of the hypotenuse.

Incidentally, the detection of an amount of deviation of scanning position in the sub-scanning direction is possible if there are provided a pair of sensors wherein an interval of timing for detecting the same light beam varies in proportion to the change of a scanning position in the sub-scanning direction, and it is also possible to make the timing of a fall of beam detection signals, instead of an interval of a rise of beam detection signals in the foregoing, to be a point of origin for measurement of time, which does not limit a shape of a detection area of a sensor.

In aforesaid method, an interval in the sub-scanning direction between laser beam L1 and laser beam L2 is detected. However, there is a possibility that an absolute sub-scanning position may be deviated. Therefore, it is acceptable to detect deviation of an absolute sub-scanning direction by comparing the standard time with time T1 or with time T2, for example, or to arrange so that a sensor for detecting that laser beam L1, for example, is scanned at its regular sub-scanning position is provided.

Figure 10:
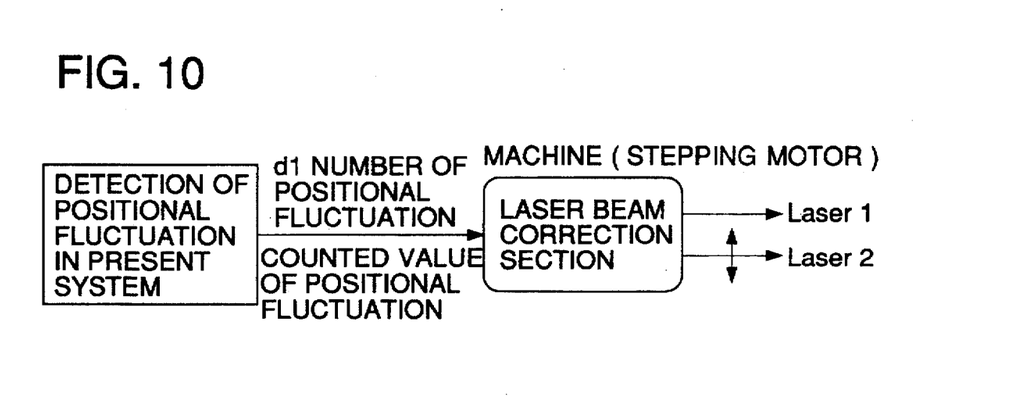
FIG. 10 is a block diagram showing how a scanning position is adjusted based on an amount of positional deviation in the sub-scanning direction.

In this case, when providing a system capable of adjusting a scanning position in the sub-scanning direction on the laser beam L2 side with a scanning position in the sub-scanning direction of laser beam L1 fixed, for example, as disclosed in Japanese Patent O.P.I. Publication No. 50809/1988, it is possible to correct an interval in the sub-scanning direction for laser beams L1 and L2 to the predetermined value, by adjusting (see FIG. 10) the scanning position in the sub-scanning direction of laser beam L2 based on information of aforesaid calculated amount of deviation with a scanning position of laser beam L1 fixed.

The apparatus disclosed in aforesaid Japanese Patent O.P.I. Publication No. 50809/1988 is of a constitution wherein a holding plate that holds a prism transmitting a laser beam is supported rotatably around a shaft that is in parallel with a plane of the prism, a prism angle is adjusted by moving an adjusting screw which is in contact with a rotary tip portion of the holding plate and determines an angle of the holding plate, and thereby a pitch (interval) in the sub-scanning direction is adjusted.

Figure 8:
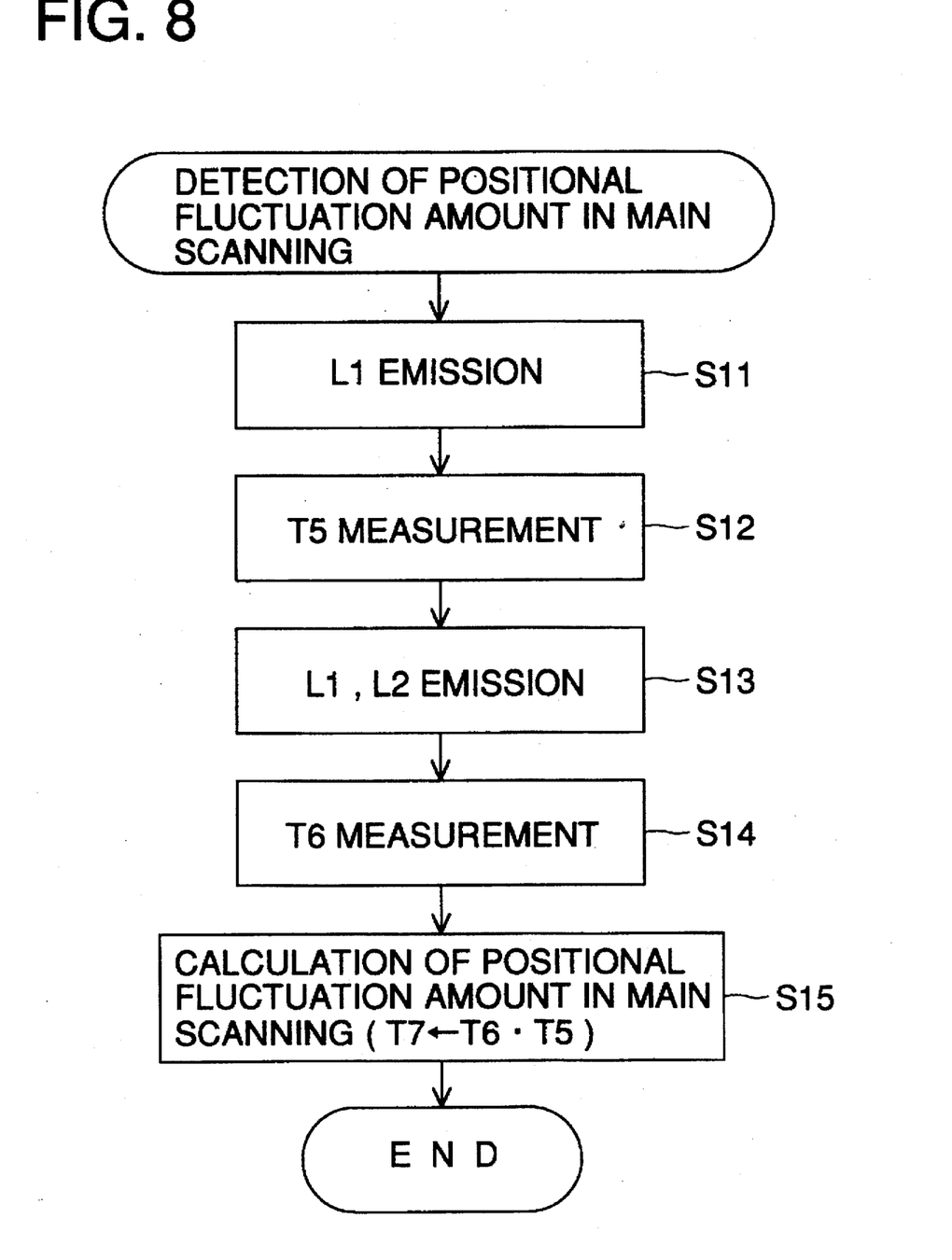
FIG. 8 is a flow chart conducting detection of an amount of positional deviations in the primary scanning direction.

Next, the detection of an amount of deviation of scanning position in the primary scanning direction will be explained as follows, referring to a flow chart in FIG. 8.

First, only laser beam L1 is lit (S11), and then, time difference (detection timing interval) T5 (see FIG. 9) between a rise (a1) where laser beam L1 is detected by sensor A and a rise (d1) where laser beam L1 is detected by sensor D is measured (S12).

In this case, since an edge on the starting side in the primary scanning direction of a light beam detection area for each of sensors A and D is in parallel with the sub-scanning direction (perpendicular to the primary scanning direction), aforesaid time difference T5 is determined only by an interval between edges on the starting sides in the primary scanning direction of sensors A and D without being affected by a scanning position in the sub-scanning direction.

Next, scanning is caused to be carried out (S13) while conducting mask control for laser beams L1 and L2 so that only laser beam L1 enters sensor A and only laser beam L2 enters sensor D, and then, time difference T6 (see FIG. 9) between a rise (a1) where laser beam L1 is detected by sensor A and a rise (d2) where laser beam L2 is detected by sensor D is caused to be measured (S14).

Aforesaid mask control can be conducted either through the control of lighting and putting off the laser beams L1 and L2 or through a method wherein laser beams L1 and L2 are caused to enter sensors A and D selectively by the use of light-deflecting elements.

Figure 9:
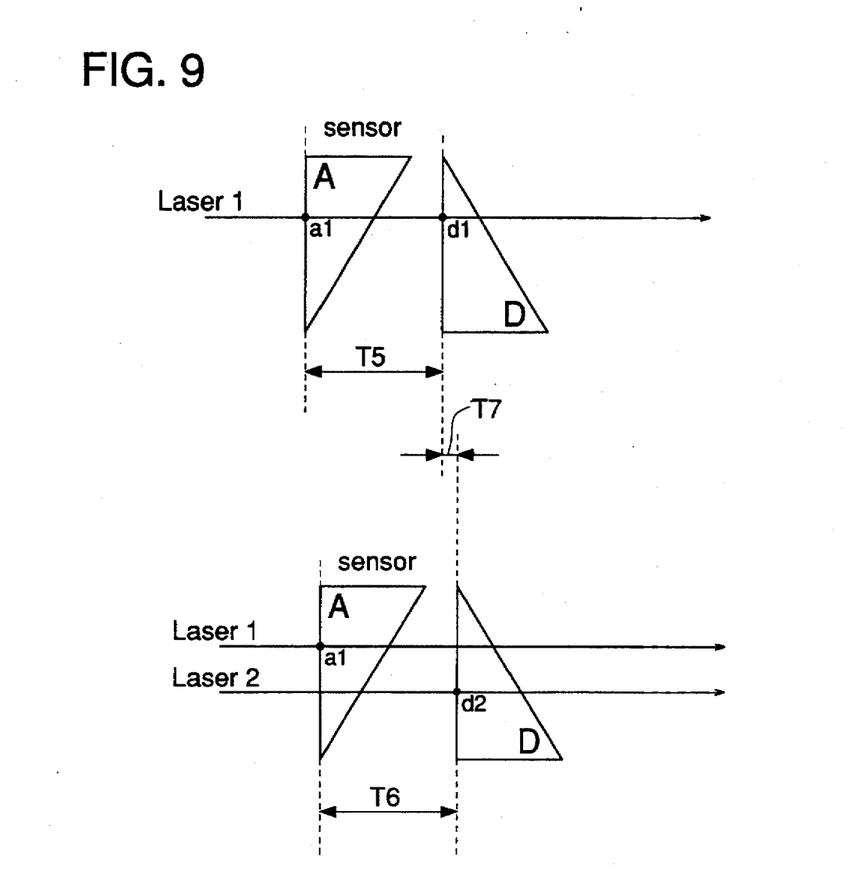
FIG. 9 is an illustration showing detection characteristics for an amount of positional deviation in the primary scanning direction.

In this case, when each of laser beams L1 and L2 is caused to scan without being deflected in he primary scanning direction, aforesaid time differences T5 and T6 must be identical to each other, and when the laser beam L2 is caused to scan falling behind the laser beam L1, for example, the delay (positional deviation of a scanning position in the primary scanning direction) is to be obtained as time T7 (=T6−T5) (see FIG. 9).

Incidentally, though sensors A and D are used to detect an amount of positional deviations of laser beams L1 and L2 in the primary scanning direction in the foregoing, it is also possible to use sensors A and C to detect an amount of positional deviation by obtaining T3 corresponding to an interval in the sub-scanning direction, in advance.

When an amount of positional deviation of a scanning position in the primary scanning direction between laser beams L1 and L2 is detected as time T7 as in the foregoing, if laser beam L2 is caused to start writing falling behind the start writing of laser beam L1 by aforesaid time T7, two laser beams L1 and L2 deviated each other in the primary scanning direction can start recording without being deviated in the primary scanning direction.

Aforesaid control of a position to start writing can be conducted by causing horizontal synchronizing signals corresponding to laser beam L2 to be generated falling behind the generation of horizontal synchronizing signals corresponding to laser beam L1 by aforesaid time T7.

The correction of positional deviations of a laser beam explained above is conducted by a program for correcting a positional deviation of a laser beam stored in ROM 95 wherein CPU 90 calculates an amount of a positional deviation in each of the sub-scanning direction and primary scanning direction based on detection timing intervals obtained by input of a rise or a fall of beam detection signals coming from sensors A–D provided on index sensor 28, and the correction based on this amount of positional deviation is conducted.

For the sub-scanning direction, a stepping motor or the like adjusts in driving adjustment prism 22A or 22B and thereby the correction of positional deviations of a beam in the sub-scanning direction is conducted so that laser beams L1 and L2 may record two scanning lines keeping a regular interval between them on photoreceptor drum 31 simultaneously. Incidentally, for this correction of positional deviations in the sub-scanning direction, an amount of positional deviation and an amount of adjustment in driving adjustment prism 22A or 22B are stored in memory 91 as a form of a table so that an amount of adjustment for driving may be obtained from the calculated amount of positional deviation, thus, it is possible to conduct adjustment for driving.

For the primary scanning direction, positional deviations in the primary scanning direction can be corrected by causing horizontal synchronizing signals corresponding to laser beam L2 to be generated falling behind the generation of horizontal synchronizing signals corresponding to laser beam L1 by aforesaid time T7.

(F5) After conducting the correction of positional deviations for two laser beams, two laser beams of at least one kind are used to make processing for conducting correction for image forming. In the present example, a test patch is written by a laser beam which has been corrected in terms of positional deviation so that maximum density correction and gradation correction may be conducted.

The maximum density correction is conducted by forming a test patch image for controlling the maximum density by the use of a laser beam corrected in terms of positional deviation and by detecting its density.

For the detection of density of the test patch image for controlling the maximum density, photoreceptor drum 31 is charged in the same manner as in aforesaid image forming through the control of CPU 90 under the condition that no toner is staying on the photoreceptor drum 31, then, plural latent images of the test patch for controlling maximum density are written in the sub-scanning direction on the photoreceptor drum 31 when test pattern signals of a patch image for controlling maximum density are sent from image signal processing section 60 to writing unit 20. An exposure level in this case is constant, and in the case of 8-bit digital signals in terms of pulse width modulation, for example, level 255 corresponding to solid black is used. After detecting the phase of photoreceptor drum 31 by means of phase signals from aforesaid encoder, the CPU 90 drives developing unit 33 at a position synchronized with aforesaid latent image to conduct reversal development. The speed of revolution of developing sleeve 33A of developing unit 33 in the course of developing operation is changed for each test patch latent image through the control conducted by CPU 90 for development driving section 33M that drives the developing sleeve 33A, thus, the test patch latent images are developed and visualized to be a plurality of test patch images each being different in terms of density. The test patch image for controlling maximum density passes through the positions of retreated transfer unit 34 and separation unit 35, and its density is detected and amplified by temperature detection sensor PC provided at the upstream side of cleaning unit 39, then is sent in succession to CPU 90 as patch density data. After this, the test patch image is removed by the cleaning unit 39.

The CPU 90 detects, among aforesaid patch density data, a speed of revolution (linear speed) of the developing sleeve 33A which is within a range of stipulated density established in advance, and stores it in RAM in which the speed of revolution mentioned above is housed. The speed of revolution (linear speed) of the developing sleeve 33A is fixed by sending designated signals to the development driving section 33M so that the speed of revolution (linear speed) can be used in image forming thereafter. Owing to this, the change in maximum density of copy images caused by environmental conditions or by deterioration of light-sensitive layers of photoreceptor drum 31 can be corrected. Ordinary stipulated density is set to 1.4. The basis for this density value of 1.4 is that the density of 1.35 or more provides sufficient grade of copy images. Though this correction control of the maximum density can also be carried out by changing toner density (mixture ratio) in developer or changing an amount of transport for developer on developing sleeve 33A, a method for the correction control wherein the speed of revolution of the developing sleeve 33A is changed is excellent on the points that neither toner contamination nor fog is caused.

After the maximum density of copy images is corrected to the stipulated density in the aforesaid manner, correction of gradation is further conducted successively.

The correction of gradation is also conducted in the manner wherein a test pattern for correcting gradation is formed, then density on the test pattern is detected, and then, calculation processing is conducted.

For the correction of gradation, photoreceptor drum 31 is charged in the same manner as in the aforesaid image forming through the control of CPU 90 under the condition that no toner stays on the photoreceptor drum 31, and test pattern signals for gradation correction are sent from image signal processing section 60 to a semiconductor laser of writing unit 20. When this test pattern is on the level of 0–255 of 8-bit digital signal, for example, PWM signals at 8-level intervals are sent to the semiconductor laser of writing unit 20, and latent images of plural test patches are written on the photoreceptor drum 31 in the sub-scanning direction. These latent images are subjected to reversal development carried out by developing unit 33 on which the speed of revolution of developing sleeve 33A is fixed, to be plural test patch images for gradation correction each varying in terms of density, and they pass through positions of retreated transfer unit 34 and separation unit 35, and are detected in terms of density by temperature detection sensor PC. A series of density data detected are sent to CPU 90 and to image signal processing circuit 60 as gradation correction data, thus, output from a density detection device for test patch images is converted to density of a patch image.

Due to the control of CPU 90, densities of patch images obtained from aforesaid sensor are interpolated on image processing circuit 60 to be a continued curve which represents printer characteristics. As an interpolation method, a linear interpolation method can be used sufficiently. An inverse function of this serves as a gradation correction curve. The product of a curve showing printer characteristics and a curve for gradation correction represents a straight line inclined by 45°. Such gradation correction curve is stored in RAM 96, and for image forming, image signals are corrected in accordance with the gradation correction curve called out of the RAM 96, and then are inputted in writing unit 20 to form a latent image. Therefore, a gradation change caused by a change of printer characteristics resulted from deterioration of a photoreceptor of photoreceptor drum 31 and from a change in environmental conditions both encountered during the usage of an apparatus can be corrected.

(F6) A heating circuit for heater 37D in fixing unit 37 is turned on when the power supply is turned on, and heating continues even in the course of aforesaid correction processing, while temperature sensor 37C is detecting whether the temperature reaches the established fixing temperature or not. When the temperature reaches the fixing temperature and thereby the warm-up operation of a fixing unit is completed, it is preferable to move to a flow of (F7). Though the moving to a flow of (F7) is after the completion of warm-up operation in the present example, moving to a flow of (F7) may also be carried out immediately before the completion of warm-up operation. For judging correctly the moment that is immediately before the completion of warm-up operation, it is also possible to establish a standard temperature which is slightly lower (for example, lower by 5° C.) than the fixing temperature and thereby to move to a flow of (F7) when the temperature sensor 37C detects the standard temperature. Even in the case of moving to a flow of (F7) after the completion of warm-up, a flow of (F7) may also be carried out within a period from completion of warm-up operation to the first image forming.

(F7) Correction of positional deviations in the sub-scanning direction is conducted. This is the second adjustment because the correction has been conducted in a flow of (F3). With regard to the correction, explanation thereof will be omitted since processing steps therein are the same as those explained in a flow of (F3). Incidentally, in the flow of (F7), it is preferable that correction of a positional deviation of a beam in the sub-scanning direction and that in the primary scanning direction are conducted together.

Figure 4:
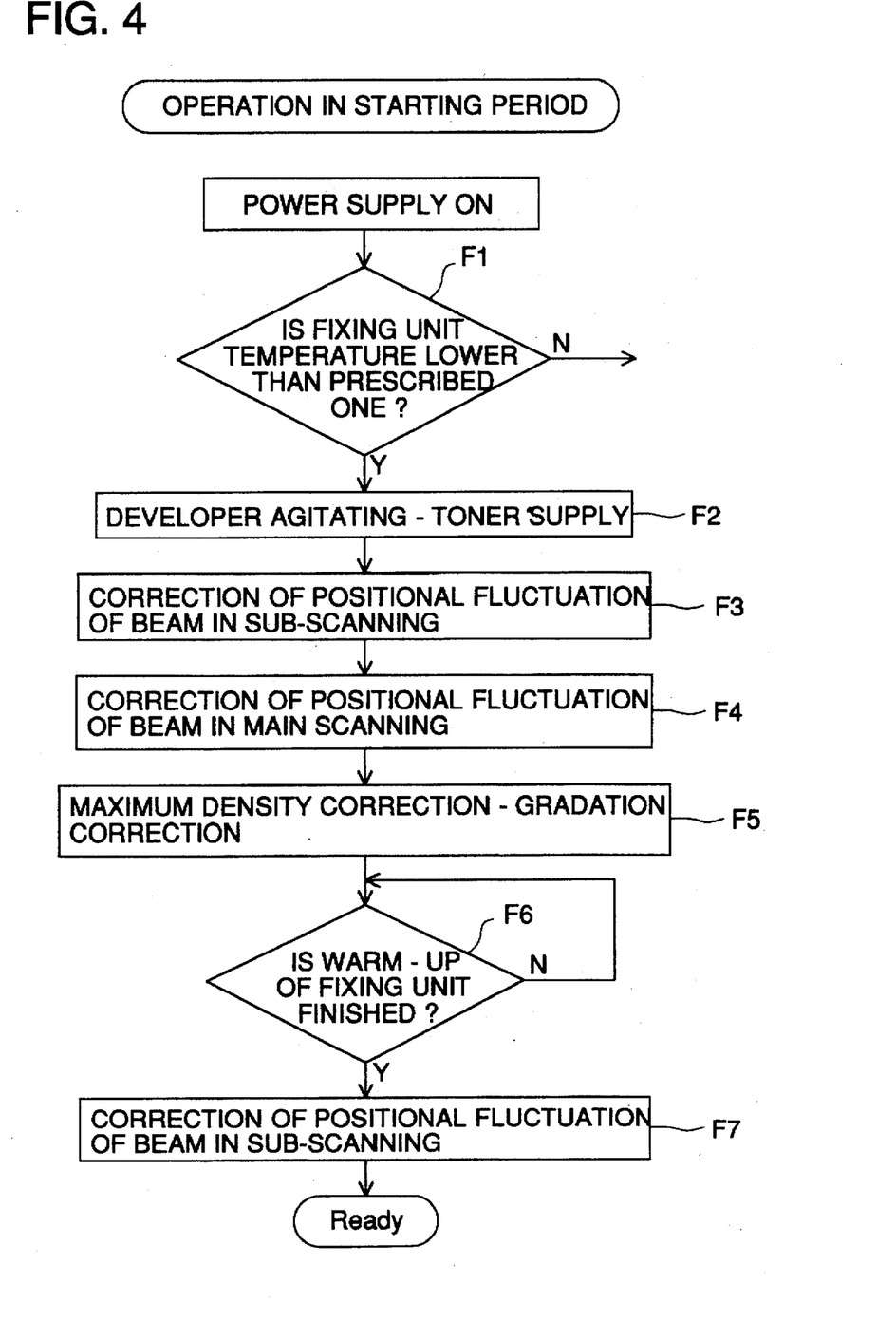
FIG. 4 is a flow chart of process control of the invention.

According to experiments made by the inventors of the invention, positional deviations of a beam in the sub-scanning direction are corrected twice as shown in a flow of FIG. 4, as correction processing on the occasion of a rise, and it was cleared that the correction needs to be done around (F5) flow, and the second correction needs to be done at the moment of completion of warm-up operation or the moment close to completion of warm-up operation for the purpose of forming images with high image quality.

When the first correction of positional deviations of a beam in the sub-scanning direction was omitted in (F3) flow, the correction of maximum density and that of gradation conducted in (F5) flow were all deviated from the appropriate correction, and images thereafter showed poor reproducibility. In the (F5) flow, it is preferable that both the correction of maximum density and that of gradation are conducted for reproducing excellent images, though either one of them also will do.

When the second correction of positional deviations of a beam in the sub-scanning direction was omitted in (F7) flow, deviation of 10 μm–30 μm in the sub-scanning direction was observed on print images on the occasion of image forming thereafter. Namely, deviation of 10 μm–30 μm in the sub-scanning direction caused by changes in temperature and humidity after the first correction was corrected by the (F7) flow, and images with high image quality were obtained stably in the image forming thereafter.

Though above examples have been explained, referring to an example of an image forming apparatus having therein an image reading unit, the invention is not limited to this, and it can naturally be applied also to an image forming apparatus having therein a writing system which writes images by means of plural laser beams such as an electrophotographic printer having no image reading unit and an image forming apparatus of an electrostatic recording system.

Due to the invention, even in the case of an image forming apparatus having therein a writing system which writes images by means of plural laser beams, there can be conducted both correction of those including positional deviations of a laser beam and preparation operations, utilizing the so-called warm-up state that is required for a fixing unit to rise to its fixing temperature. Therefore, it has become possible to provide an image forming apparatus which makes it possible to obtain copy images with extremely high image quality and high definition and a method for controlling the image forming apparatus.

What is claimed is:

1. A method for controlling an image forming apparatus having a photoreceptor and a writing system to write an image on said photoreceptor with a plurality of laser beams, comprising the steps of:

correcting positional deviations among said plurality of laser beams when said image forming apparatus is in a warm-up state in succession to a turn-on operation of said image forming apparatus;

conducting corrections, including at least one of maximum density correction and gradation correction, for image forming operation of said image forming apparatus by providing at least one standard density pattern on said photoreceptor with said plurality of laser beams when said image forming apparatus is in said warm-up state; and repeating said correcting step of positional deviations among said plurality of laser beam when said image forming apparatus is in said warm-up state.

2. The method of claim 1, wherein said image forming apparatus includes a fixing unit for fixing an image transferred onto a recording sheet from said photoreceptor, and said repeating step of said correcting step is conducted either immediately before the end of a warm-up operation of said fixing unit or after said warm-up operation of said fixing unit when said image forming apparatus is in said warm-up state.

3. A method for controlling an image forming apparatus having a photoreceptor and a writing system to write an image on said photoreceptor with a plurality of laser beams, comprising the steps of:

correcting positional deviations among said plurality of laser beams when said image forming apparatus is in a state that a temperature of a predetermined portion of said image forming apparatus is detected lower than a predetermined temperature in succession to a turn-on operation of said image forming apparatus;

conducting corrections, including at least one of maximum density correction and gradation correction, for image forming operation of said image forming apparatus by providing at least one standard density pattern on said photoreceptor with said plurality of laser beams when said image forming apparatus is in said state; and repeating said correcting step of positional deviations among said plurality of laser beam when said image forming apparatus is in said state.

4. The method of claim 3, wherein said predetermined portion of said image forming apparatus is a fixing unit for fixing an image transferred onto a recording sheet from said photoreceptor.

* * * * *